United States Patent [19]

Trepl, II

[11] Patent Number: 4,469,955
[45] Date of Patent: Sep. 4, 1984

[54] FLOAT WITH MEANS FOR COMPENSATING FOR TIDE HEIGHT DIFFERENCES

[76] Inventor: John A. Trepl, II, 1691 Mesa Dr., #F-13, Costa Mesa, Calif. 92707

[21] Appl. No.: 480,356

[22] Filed: Mar. 30, 1983

Related U.S. Application Data

[62] Division of Ser. No. 241,659, Mar. 9, 1981, Pat. No. 4,379,235.

[51] Int. Cl.³ .................................. F03B 13/12
[52] U.S. Cl. ........................... 290/53; 60/498; 60/499; 60/506; 290/42
[58] Field of Search .................. 290/42, 53; 417/330–333, 337; 60/495, 496, 497, 498, 499, 502, 506

[56] References Cited

U.S. PATENT DOCUMENTS

| | | | |
|---|---|---|---|
| 606,561 | 6/1898 | Leonard | 417/332 |
| 616,467 | 12/1898 | Jones | 417/332 |
| 953,600 | 3/1910 | Edens | 417/333 |
| 1,746,613 | 2/1930 | Shuler | 60/499 |

Primary Examiner—B. Dobeck
Assistant Examiner—Shelley Wade
Attorney, Agent, or Firm—Weissenberger and Peterson

[57] ABSTRACT

A float having depending fins and a curved surface on which waves impinge. The float provides an additional lift over and beyond its buoyancy. The float is coupled through a swivel to allow it to turn into the direction of waves. The float is additionally provided with an arrangement to compensate for variations in the mean water level due to tide action.

22 Claims, 9 Drawing Figures

FLOAT WITH MEANS FOR COMPENSATING FOR TIDE HEIGHT DIFFERENCES

RELATED APPLICATION

This is a divisional application of Ser. No. 241,659 for WAVE ACTION GENERATOR, filed Mar. 9, 1981 by the same inventor, issued as U.S. Pat. No. 4,379,235 on Apr. 5, 1983.

BACKGROUND OF THE INVENTION

This invention relates to floats and arrangement of coupling thereof in different apparatuses. The invention is particularly useful in devices for generation of electrical power from wave action.

Prior efforts to harness the power of sea water motion have usually involved complex schemes relying mostly on tidal action or on some complex utilization scheme of the wave motion at a given tide level. In remote coastal areas where power need be generated only on a relatively small scale, the previously proposed schemes are impractical due to their cost. A need therefore exists for a simple, reliable device which would be capable of economically providing electricity from the wave action of sea water for both large and small applications.

It is also desirable to have a float with mechanism to allow it to turn into the direction of waves with a castering action, and an arrangement to compensate for tide height variations.

Various types of float arrangements are known. For example, U.S. Pat. No. 4,260,901 to Woodbridge shows floats that merely move up and down with wave motion. U.S. Pat. No. 3,965,365 to Parr shows a power float, support floats and sensing floats. The sensing floats detect the contour of the waves and through drive means cause spacing of the main floats for greater efficiency. U.S. Pat. No. 1,923,887 to Renda shows a float that is rocked by wave action. U.S. Pat. No. 1,746,613 to Shuler shows a float attached by a swivel to allow turning. The float has a curved surface 43c on top of which the waves impinge to push the float down. These various floats are not efficient and do not have arrangement to compensate for tide height variations.

SUMMARY OF THE INVENTION

It is an object of the present invention to provide a float to obtain an additional lift, above and beyond the lift provided by the buoyancy of the float itself.

It is another object of the present invention to provide a float that will turn into the direction of any current for greater efficiency.

It is still another object of the present invention to provide an arrangement to compensate for variations in the mean water level due to tidal action.

In accordance with this invention, the float is so configured as to derive lifting power not only from the up-and-down motion of the waves themselves, but also from the horizontal motion of any currents which may exist from time to time at the location where the device is placed.

The present invention also provides a simple and reliable means of utilizing the full wave motion at any tide height. It accomplishes this with a mechanism which automatically adjusts the device whenever the float-operated device reaches the end of its travel capability as a result of the rising or falling of the tide.

DETAILED DESCRIPTION OF THE DRAWINGS

Figure 1:
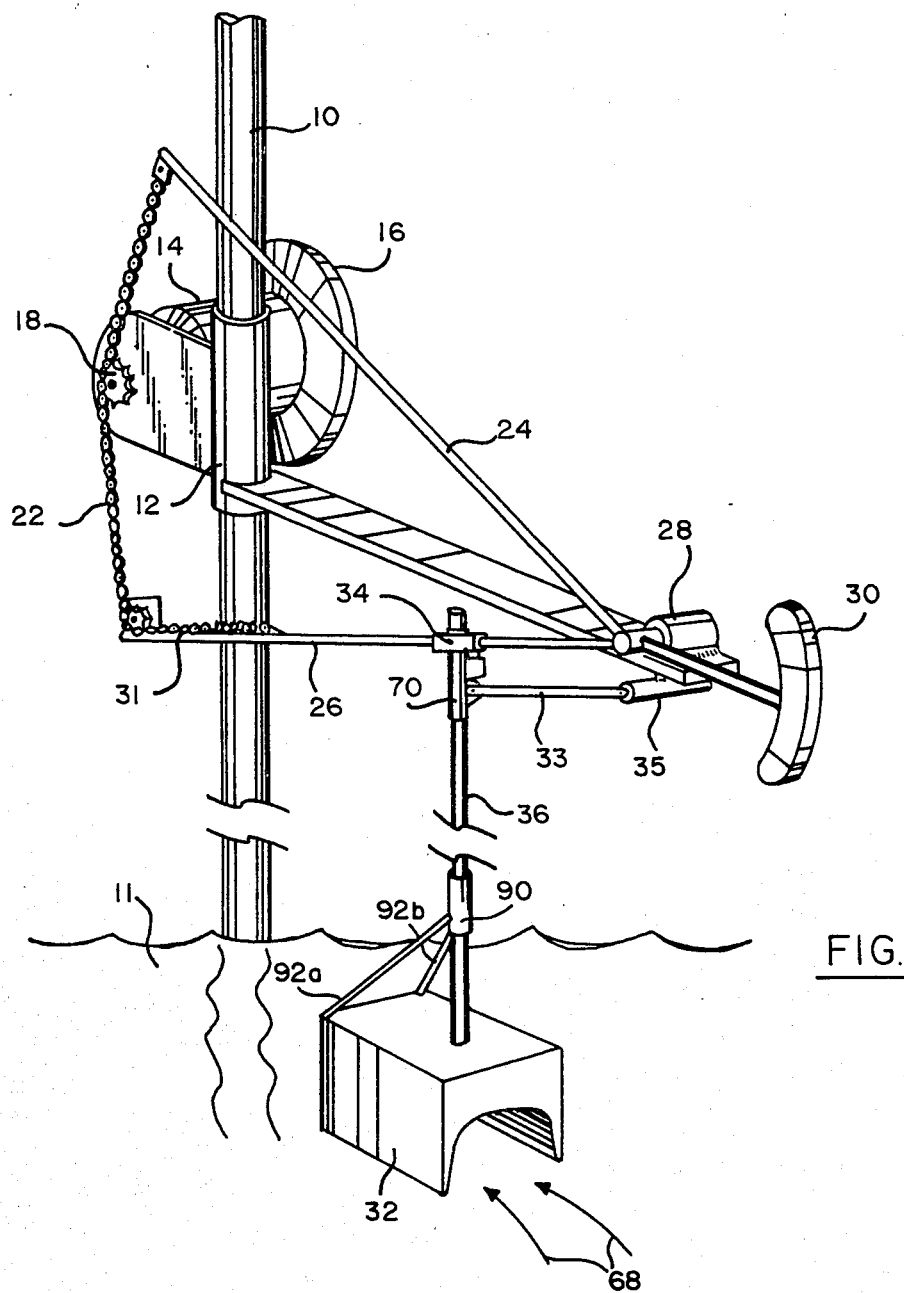
FIG. 1 is a perspective view showing a preferred embodiment of the invention in its natural environment.

FIG. 1 shows a float 32 of the present invention to be utilized with an apparatus for deriving power from wave action of a body of water 11. FIG. 1 shows, by way of illustration, a wave action generator utilizing the float arrangement of the present invention. A support such as a pole or mast 10 is positioned in an appropriate location in a body of water 11 whose wave motion is to be utilized. A mounting bracket 12 attached to the mast 10 supports a generator 14 equipped with a flywheel 16. The flywheel 16 is driven by sprocket 18 through a conventional one-way clutch (not shown). The one-way clutch is preferably so arranged as to cause the mechanism to drive the flywheel 16 on the upward motion of the chain 22, and to be disengaged from the flywheel 16 and generator 14 during the downward movement of the chain 22. Alternatively, conventional transmission means (not shown) may be provided in lieu of the one-way clutch to drive the flywheel 16 through appropriate oppositely ratcheted gearing arrangements in the same direction during both the upward and downward movement of chain 22.

The chain 22 extends between the outer ends of a pair of rigidly connected arms 24, 26 mounted for pivotal motion in pivot bearing 28 attached to the bracket 12. A counterweight 30 is preferably provided to balance the arms 24, 26 with respect to the bearing pivot 28. A tension spring 31 may be provided to hold the chain 22 taut against the pinion gear 18.

A float 32 whose specific construction will be discussed hereinbelow is pivotably mounted at 34 to arm 26. A link 33 cooperates with the shaft 36 of float 32, the arm 26, and a bracket 35 to form a pantograph arrangement which keeps the float shaft 36 vertical at all times.

Figure 2:
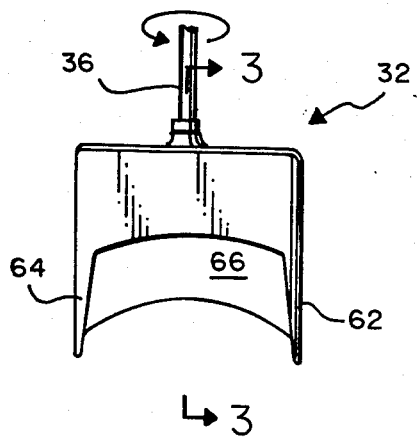
FIG. 2 is an end elevation of a preferred type of float suitable for use with the invention.
Figure 3:
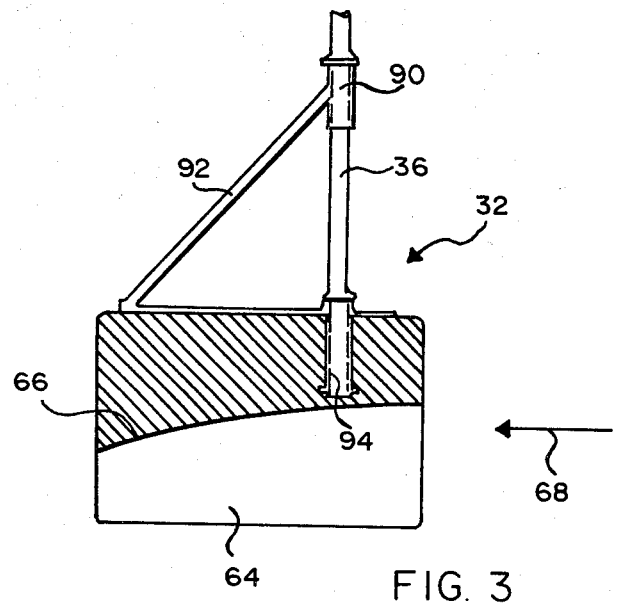
FIG. 3 is a vertical section of the float along line 2—2 of FIG. 2.

FIGS. 2 and 3 depict a preferred embodiment of float 32. In this preferred embodiment, the float 32 (which may be hollow or constructed of a buoyant material) is suspended from float shaft 36 through a swivel mechanism 60 which allows the depending lateral vanes 62, 64 to coact with the curved surface 66 in positioning the float 32 so that any tidal or other currents existing in the body of water 11 (FIG. 1) will cause the water flow to approach the float in the direction of the arrow 68 (FIG. 3). When this is the case, the curvature of the surface 66 produces additional lift for the float 32, as a current of water impinges against it, above and beyond the lift provided by the buoyancy of the float itself.

The float 32 automatically swings into the direction of any current 68 which may exist in the body of water, by way of a swivel arrangement consisting of a journal 90 supporting a pair of diverging arms 92a and 92b and a journal 94 formed in a body of float 32 to pivotally receive the end of float shaft 36. By this arrangement, the float 32 will turn into the direction of any current 68 much in the same way as a weather vane turns into the wind (i.e. by a castering action). The position of the journal 94 and the arms 92 with respect to the body of float 32 is such that the combined wave and tidal action will produce an upward force centered approximately in a direction coaxial with the float shaft 36.

Figure 4:
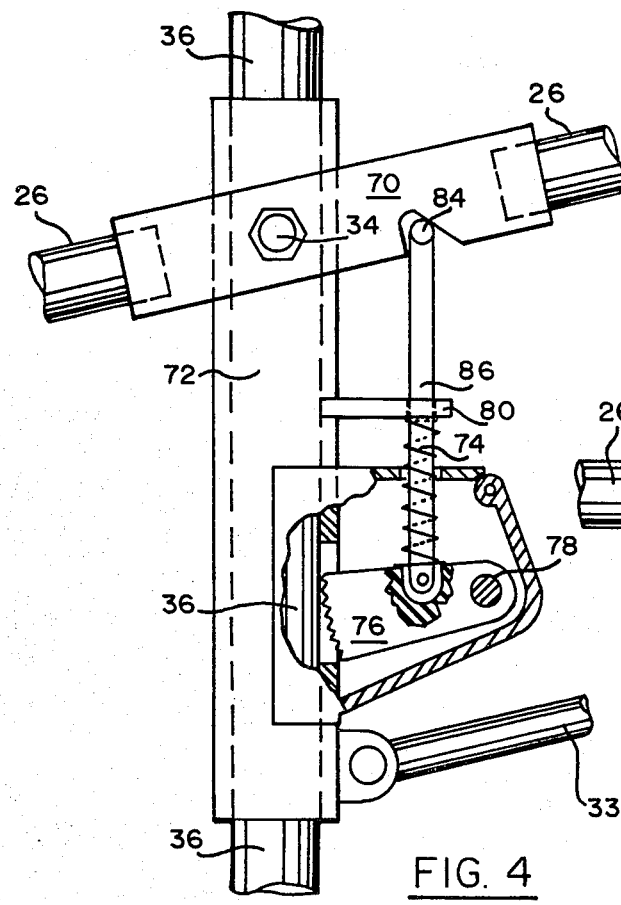
FIG. 4 is a side elevation of a mechanism designed to compensate for tidal height variations.
Figure 5:
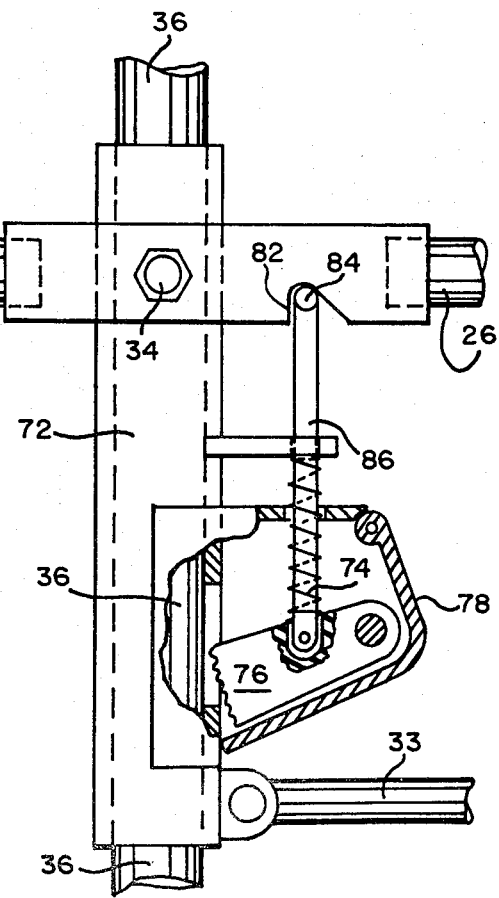
FIG. 5 is a view similar to FIG. 4 but showing the mechanism in a position corresponding to the top of the impeller's stroke during a rising tide.

FIGS. 4 and 5 illustrate an adjustment mechanism which compensates for variations in the mean water level due to tidal action. The lower arm 26 of the device of FIGS. 1 (arm 26 may be a part of any other device) is interrupted at the pivot point 34 by a notched bracket 70 which is pivotally connected to the sleeve 72 at the pivot point 34. A tension spring 74 tends to pull the toothed plate 76 upwardly about pivot 78 toward the bracket 80 which is mounted on sleeve 72. As long as the toothed plate 76 is in contact with float shaft 36 inside sleeve 72, float shaft 36 is rigidly held with respect to sleeve 72 and operates as previously described in connection with FIGS. 1 through 3.

During a rising tide, the float during its upward stroke tends to push the lower arm higher and higher. Eventually the top of the upstroke of the float will result in the condition shown in FIG. 5. At that point, the notch 82 of the notched bracket 70 engages the horizontal portion 84 of the operating arm 86 and pushes it downward. This causes toothed plate 76 to pivot downwardly about pivot 78 against the tension of spring 74 and to swing clear of float shaft 36 in sleeve 72. A further rising of the float now causes the float shaft 36 to move upwardly within sleeve 72 and thus to shorten the effective length of float shaft 36. As soon as the downstroke of the float begins, the notch 82 disengages the operating arm 86, and the float shaft once again becomes locked to sleeve 72.

With a lower tide, the end of the downstroke of float shaft 36 eventually results in a condition where the float 32 comes out of the water. At this point, the weight on the float shaft 36 is considerably increased and this weight increase is enough to overcome the action of tension spring 74, thereby allowing float shaft 36 to slide downward within sleeve 72 by pulling the toothed plate 76 out of engagement with its wall.

It will be seen that the action of the mechanism of FIGS. 4 and 5 is such as to adjust the effective length of float shaft 36 to where the float 32 can always make a full stroke in response to the wave motion.

Figure 6:
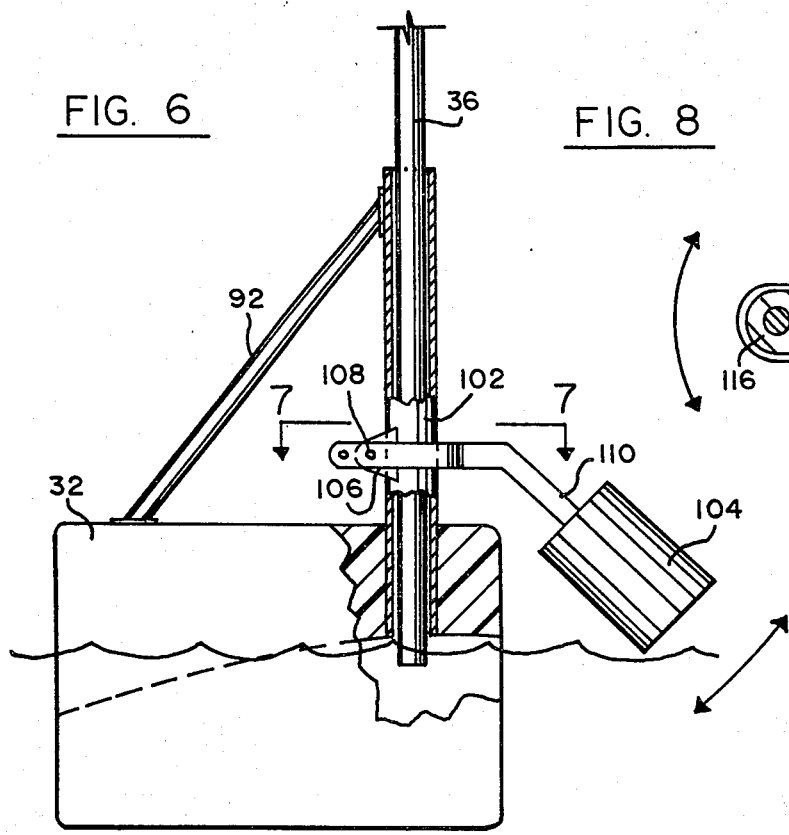
FIG. 6 is a fragmentary side elevation, partly in section, showing an alternative tidal neight variation mechanism.
Figure 8:
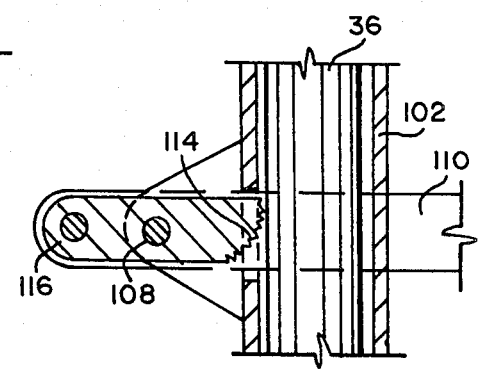
FIG. 8 is an enlarged vertical detail section along line 8—8 of Fig. 7.
Figure 7:
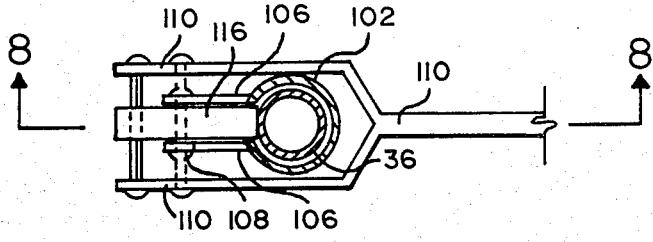
FIG. 7 is a horizontal section along line 7—7 of FIG. 6.

An alternative embodiment of the tide height adjustment mechanism for float shaft 36 is shown in FIGS. 6 through 8.

As shown in FIG. 6, the float 32 is equipped with a sleeve 102 extending preferably between the upper ends of the arms 92 and the body of float 32. The float shaft 36 is slidably received within sleeve 102, and a relatively small control float 104 is attached to the sleeve 102 by means of a bracket 106 carrying pivot bearing 108 in which the arm 110 of control float 104 is journalled.

The action of the mechanism shown in FIGS. 6 through 7 is as follows:

As the water level rises, the float shaft 36 eventually reaches the top of its stroke at a time when the water level at the crest of the wave is still rising. Inasmuch as the float 32 can now move no higher, the float 32 becomes submerged. As it does so, the water level with respect to the float 32 rises sufficiently to raise the control float 104. This causes arm 110 to pivot in a counterclockwise direction about pivot journal 108. The toothed convolute end surface 114 (FIG. 8) of dog 116, which in FIG. 12 firmly engages the float shaft 36, now releases the float shaft 36 so as to allow the float 32 to rise with respect to float shaft 36 until the resultant lowering of control float 104 once again locks float shaft 36 to sleeve 102.

As the tide falls, the float 32 eventually tends to rise out of the water in the trough of a wave at the lower end of the stroke of float shaft 36. When this happens, the weight of float 32 (which is considerably greater than the weight of control float 104) overcomes the locking action of the toothed convolute surface 114 and pulls the control float 104 up sufficiently to allow the sleeve 102 to slide downwardly on float shaft 36 until float 32 again floats at its normal level in the water.

Figure 9:
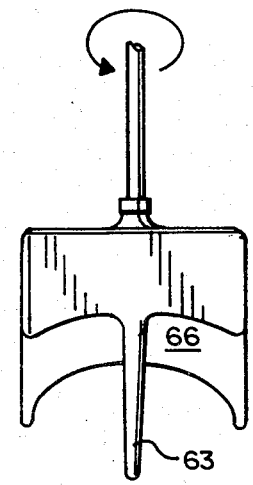
FIG. 9 is an end view showing a float with a single fin.

It should be noted that while FIGS. 1-6 have shown the float having two fins, it is possible to provide only one fin 63, as shown in FIG. 9. The one fin 63 may be coupled at the center of curved surface 66. It would operate in the same manner as the parallel fins in directing the curved surface to be impinged upon by the water current.

It should be understood that the float of the present invention, and the adjusting mechanism to compensate for the rise and fall in water level is not limited in its application to wave action generators. They may be utilized with any sort of apparatus.

For example, in the figures arm 26 and shaft 36 may represent parts of any device with which the present float and arrangement to compensate for tide height are used. The operation of the float and the compensation arrangement would be the same.

Whereas the present invention has been described with a certain degree of particularity, it should be understood that other and further modifications may be made within the scope and spirit of this invention. The invention is not to be limited to the specific embodiment shown herein, but is to be limited only by the attached claims and each element thereof be entitled to the full range of equivalency.

What is claimed is:

1. A float for responding to wave currents comprising:
   (a) a buoyant float body adapted to be partically submerged;
   (b) at least one fin means depending from said body;
   (c) said body having on its underside an inclined surface whose upper end is generally adjacent one end of said fin means and whose lower end is generally adjacent the other end of said fin means, said upper end being higher than said lower end; and
   (d) means arranged to support said float for pivotal movement about a generally vertical axis.

2. The float of claim 1, in which said axis is substantially offset from the center of said float so as to provide said float with a castering action.

3. The float of claim 1 wherein said inclined surface forms a curved surface.

4. The float of claim 1 wherein said float has a certain buoyancy, and said inclined surface, when water current impinges against it, provides additional lift to said float, above and beyond the lift provided by said buoyancy.

5. The float of claim 1, wherein it is constructed of buoyant material.

6. The float of claim 1 wherein it is hollow.

7. The float of claim 1, further comprising means arranged to compensate for tide height variations, said means including;
   (i) float shaft means associated with said float means;
   (ii) sleeve means surrounding said float shaft means;
   (iii) motion impeding means associated with said sleeve means and normally biased into an engagement with said float shaft means such as to prevent longitudinal sliding movement of said float shaft means with respect to said sleeve means;
   (iv) releasing means arranged to release said engagement;
   (v) control float means arranged to operate said release means upon excessive immersion of said float;
   (vi) said motion impeding means being so arranged as to become disengaged by the weight of said float means when said float means are lifted out of said body of water by said float shaft means.

8. The float of claim 1, coupled to an impeller means having a vertically limited range of movement, further comprising means arranged to compensate for tide height variations, said means including;
   (i) float shaft means associated with said float means;
   (ii) sleeve means surrounding said float shaft means;
   (iii) motion impeding means associated with said sleeve means and normally biased into an engagement with said float shaft means such as to prevent longitudinal sliding movement of said float shaft means with respect to said sleeve means;
   (iv) releasing means arranged to release said engagement when said impeller means reach the upper limit of their movement;
   (v) said motion impeding means being so arranged as to become disengaged by the weight of said float means when said float means are lifted out of said body of water by said float shaft means.

9. The device of claim 8, in which said float shaft means are vertically fixed with respect to said float means, said float shaft means are constrained to maintain a constant angle with respect to said support means, and said release means are operationally responsive to relative angular position of said float shaft means with respect to said impeller means.

10. The device of claim 9, in which said float shaft means are vertically movable with respect to said float means, and which further comprises control float said control means being arranged to operate said release means upon excessive immersion of said float means.

11. A float for responding to wave currents comprising:
   (a) a buoyant float body adapted to be partially submerged;
   (b) plurality of generally parallel fin means depending from said body;
   (c) said body having on its underside an inclined surface whose upper end is generally adjacent one end of said fin means and whose lower end is generally adjacent the other end of said fin means, said upper end being higher than said lower end; and
   (d) means arranged to support said float for pivotal movement about a generally vertical axis, said axis being substantially offset from the center of said float so as to provide said float with a castering action.

12. The float of claim 11, wherein said inclined surface forms a curved surface.

13. The float of claim 11, wherein said float has a certain buoyancy, and said inclined surface, when water current impinges against it, provides additional lift to said float, above and beyond the lift provided by said buoyancy.

14. The float of claim 11, wherein it is constructed of buoyant material.

15. The float of claim 11, wherein it is hollow.

16. The float of claim 11, further comprising means arranged to compensate for tide height variations, said means including;
   (i) float shaft means associated with said float means;
   (ii) sleeve means surrounding said float shaft means;
   (iii) motion impeding means associated with said sleeve means and normally biased into an engagement with said float shaft means such as to prevent longitudinal sliding movement of said float shaft means with respect to said sleeve means;
   (iv) releasing means arranged to release said engagement;
   (v) control float means arranged to operate said release means upon excessive immersion of said float;
   (vi) said motion impeding means being so arranged as to become disengaged by the weight of said float means when said float means are lifted out of said body of water by said float shaft means.

17. The float of claim 11, coupled to an impeller means having a vertically limited range of movement, further comprising means arranged to compensate for tide height variations, said means including;
   (i) float shaft means associated with said float means;
   (ii) sleeve means surrounding said float shaft means;
   (iii) motion impeding means associated with said sleeve means and normally biased into an engagement with said float shaft means such as to prevent longitudinal sliding movement of said float shaft means with respect to said sleeve means;
   (iv) releasing means arranged to release said engagement when said impeller means reach the upper limit of their movement;
   (v) said motion impeding means being so arranged as to become disengaged by the weight of said float means when said float means are lifted out of said body of water by said float shaft means.

18. The device of claim 17, in which said float shaft means are vertically fixed with respect to said float means, said float shaft means are constrained to maintain a constant angle with respect to said support means, and said release means are operationally responsive to relative angular position of said float shaft means with respect to said impeller means.

19. The device of claim 18, in which said float shaft means are vertically movable with respect to said float means, and which further comprises control float said control means being arranged to operate said release means upon excessive immersion of said float means.

20. A float for responding to wave currents and having arrangement to compensate for water level variations, said float coupled to cause movement in a device, said float comprising:

(a) a buoyant float body adapted to be partially submerged;
(b) generally parallel fin means depending from said body;
(c) said body having on its underside an inclined surface whose upper end is generally adjacent one end of said fin means and whose lower end is generally adjacent the other end of said fin means;
(d) means arranged to support said float for pivotal movement about a generally vertical axis, substantially offset from the center of said float so as to provide said float with a castering action; and
(e) means arranged to compensate for tide height variations, said means including:
   (i) float shaft means associated with said float means;
   (ii) sleeve means surrounding said float shaft means;
   (iii) motion impeding means associated with said sleeve means and normally biased into an engagement with said float shaft means such as to prevent longitudinal sliding movement of said sloat shaft means with respect to said sleeve means;
   (iv) releasing means arranged to release said engagement when said device reaches the upper limit of its movement;
   (v) control float means arranged to operate said release means from excessive immersion of said float; and
   (vi) said motion impeding means being so arranged as to become disengaged by the weight of said float means when said float means are lifted out of said body of water by said float shaft means.

21. The device of claim 20, in which said float shaft means are vertically fixed with respect to said float means, said float shaft means are constrained to maintain a constant angle with respect to said support means, and said release means are operationally responsive to relative angular position of said float shaft means with respect to said impeller means.

22. The device of claim 20, in which said float shaft means are vertically movable with respect to said float means.

* * * * *

UNITED STATES PATENT AND TRADEMARK OFFICE
CERTIFICATE OF CORRECTION

PATENT NO. : 4,469,955
DATED : 04 September 1984
INVENTOR(S) : Trepl

It is certified that error appears in the above—identified patent and that said Letters Patent is hereby corrected as shown below:

Column 4, line 54 - "partically" should read --partially--.

Signed and Sealed this

Thirtieth Day of April 1985

[SEAL]

Attest:

DONALD J. QUIGG

Attesting Officer    Acting Commissioner of Patents and Trademarks